US012647372B2

(12) United States Patent

He et al.

(10) Patent No.: US 12,647,372 B2

(45) Date of Patent: Jun. 2, 2026

(54) PROTOCOL-DATA-UNIT-SET-BASED DISCARDING OR PROCESSING

(71) Applicant: QUALCOMM Incorporated, San Diego, CA (US)

(72) Inventors: Linhai He, San Diego, CA (US); Dario Serafino Tonesi, San Diego, CA (US); Peerapol Tinnakornsrisuphap, San Diego, CA (US); Prashanth Haridas Hande, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 18/169,004

(22) Filed: Feb. 14, 2023

(65) Prior Publication Data

US 2024/0275732 A1     Aug. 15, 2024

(51) Int. Cl.
*H04L 47/32* (2022.01)

(52) U.S. Cl.
CPC .................................... *H04L 47/32* (2013.01)

(58) Field of Classification Search
None
See application file for complete search history.

(56) References Cited

U.S. PATENT DOCUMENTS

| | | | |
|---|---|---|---|
| 2022/0141146 A1* | 5/2022 | Fu ........................... | H04L 47/28 370/236 |
| 2024/0121663 A1* | 4/2024 | Malik ..................... | H04L 47/32 |
| 2025/0119785 A1* | 4/2025 | Rao .................. | H04W 28/0236 |
| 2025/0133030 A1* | 4/2025 | Chen .................... | H04L 69/321 |

OTHER PUBLICATIONS

Apple: "Packet Discarding and Reordering Enhancements in XR", 3GPP TSG-RAN WG2 Meeting #120, R2-2211720, Toulouse, France, Nov. 14-18, 2022, Nov. 4, 2022, 5 Pages, XP052215824, p. 1-p. 4.
CATT: "PDU Discard of XR Services", 3GPP TSG-RAN WG2 Meeting #120, R2-2211439, Toulouse, France, Nov. 14-18, 2022, Nov. 4, 2022, 7 Pages, XP052215548, Sec. 1, Secs. 2-1-2.3.
Interdigital Inc: "Discussion on PDU discard", 3GPP RAN WG2 Meeting #120, R2-2212473, Toulouse, France, Nov 14-Nov. 18, 2022, Nov. 3, 2022, 3 Pages, XP052216543.
International Search Report and Written Opinion—PCT/US2024/010675—ISA/EPO—May 22, 2024.
NEC: "Discussion on PDU discard for XR awareness", 3GPP TSG-RAN WG2 #120 meeting, R2-2212537, Toulouse France, Nov. 14-18, 2022, Nov. 4, 2022, 4 Pages.

* cited by examiner

*Primary Examiner* — Eunsook Choi

(74) *Attorney, Agent, or Firm* — Harrity & Harrity, LLP

(57) ABSTRACT

Various aspects of the present disclosure generally relate to wireless communication. In some aspects, a transmitter may receive a configuration of one or more packet data convergence protocol (PDCP) discard timers for protocol data unit (PDU) sets, the configuration indicating one or more PDU set parameters corresponding to the one or more PDCP discard timers. The transmitter may communicate in accordance with the configuration. Numerous other aspects are described.

22 Claims, 10 Drawing Sheets

700

710
Information regarding link
between Rx and device

720
Configuration: RLC entity
(reassembly timer) and one or more
PDU set parameters Tx (e.g.,
NN)

Rx (e.g.,
UE)

730
Receive one or more
PDUs of PDU set

740
Process one or more
PDUs according to
reassembly timer

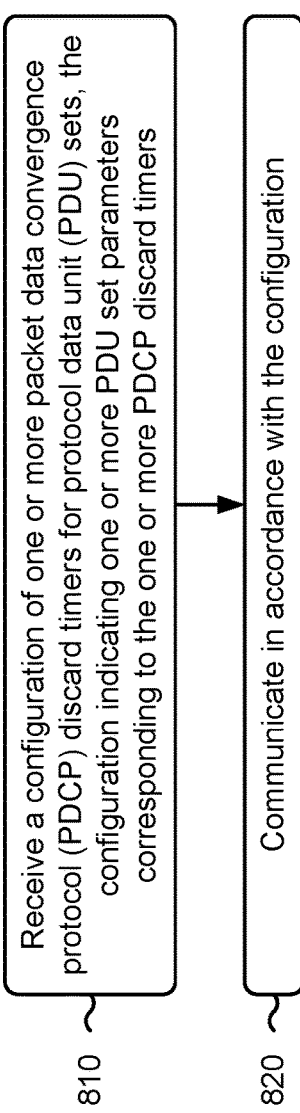
Receive a configuration of one or more packet data convergence protocol (PDCP) discard timers for protocol data unit (PDU) sets, the configuration indicating one or more PDU set parameters corresponding to the one or more PDCP discard timers
810
Communicate in accordance with the configuration
820
800
FIG. 8

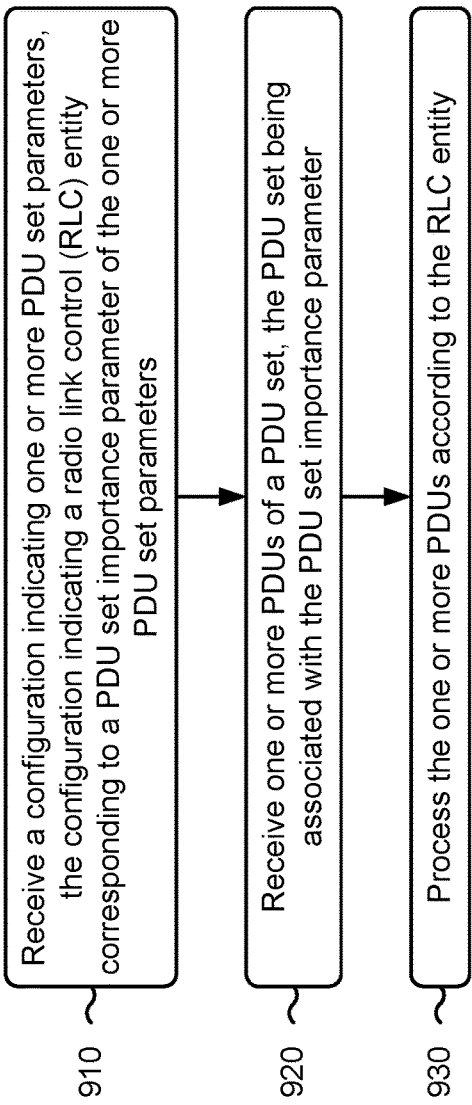

910　Receive a configuration indicating one or more PDU set parameters, the configuration indicating a radio link control (RLC) entity corresponding to a PDU set importance parameter of the one or more PDU set parameters 920　Receive one or more PDUs of a PDU set, the PDU set being associated with the PDU set importance parameter 930　Process the one or more PDUs according to the RLC entity

PROTOCOL-DATA-UNIT-SET-BASED DISCARDING OR PROCESSING

FIELD OF THE DISCLOSURE

Aspects of the present disclosure generally relate to wireless communication and to techniques and apparatuses for protocol data unit (PDU) set based discarding or processing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter. The method may include receiving a configuration of one or more packet data convergence protocol (PDCP) discard timers for protocol data unit (PDU) sets, the configuration indicating one or more PDU set parameters corresponding to the one or more PDCP discard timers. The method may include communicating in accordance with the configuration.

Some aspects described herein relate to a method of wireless communication performed by a receiver. The method may include receiving a configuration indicating one or more PDU set parameters, the configuration indicating a radio link control (RLC) entity corresponding to a PDU set importance parameter of the one or more PDU set parameters. The method may include receiving one or more PDUs of a PDU set, the PDU set being associated with the PDU set importance parameter. The method may include processing the one or more PDUs according to the RLC entity.

Some aspects described herein relate to a transmitter for wireless communication. The transmitter may include a memory and one or more processors coupled to the memory. The one or more processors may be configured to receive a configuration of one or more PDCP discard timers for PDU sets, the configuration indicating one or more PDU set parameters corresponding to the one or more PDCP discard timers. The one or more processors may be configured to communicate in accordance with the configuration.

Some aspects described herein relate to a receiver for wireless communication. The receiver may include a memory and one or more processors coupled to the memory. The one or more processors may be configured to receive a configuration indicating one or more PDU set parameters, the configuration indicating an RLC entity corresponding to a PDU set importance parameter of the one or more PDU set parameters. The one or more processors may be configured to receive one or more PDUs of a PDU set, the PDU set being associated with the PDU set importance parameter. The one or more processors may be configured to process the one or more PDUs according to the RLC entity.

Some aspects described herein relate to a non-transitory computer-readable medium that stores a set of instructions for wireless communication by a transmitter. The set of instructions, when executed by one or more processors of the transmitter, may cause the transmitter to receive a configuration of one or more PDCP discard timers for PDU sets, the configuration indicating one or more PDU set parameters corresponding to the one or more PDCP discard timers. The set of instructions, when executed by one or more processors of the transmitter, may cause the transmitter to communicate in accordance with the configuration.

Some aspects described herein relate to a non-transitory computer-readable medium that stores a set of instructions for wireless communication by a receiver. The set of instructions, when executed by one or more processors of the receiver, may cause the receiver to receive a configuration indicating one or more PDU set parameters, the configuration indicating an RLC entity corresponding to a PDU set importance parameter of the one or more PDU set parameters. The set of instructions, when executed by one or more processors of the receiver, may cause the receiver to receive one or more PDUs of a PDU set, the PDU set being associated with the PDU set importance parameter. The set of instructions, when executed by one or more processors of the receiver, may cause the receiver to process the one or more PDUs according to the RLC entity.

Some aspects described herein relate to an apparatus for wireless communication. The apparatus may include means for receiving a configuration of one or more PDCP discard timers for PDU sets, the configuration indicating one or more PDU set parameters corresponding to the one or more PDCP discard timers. The apparatus may include means for communicating in accordance with the configuration.

Some aspects described herein relate to an apparatus for wireless communication. The apparatus may include means for receiving a configuration indicating one or more PDU set parameters, the configuration indicating an RLC entity corresponding to a PDU set importance parameter of the one or more PDU set parameters. The apparatus may include means for receiving one or more PDUs of a PDU set, the PDU set being associated with the PDU set importance parameter. The apparatus may include means for processing the one or more PDUs according to the RLC entity.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a transmitter, in accordance with the present disclosure.

FIG. 9 is a diagram illustrating an example process performed, for example, by a receiver, in accordance with the present disclosure.

DETAILED DESCRIPTION

Figure 1:
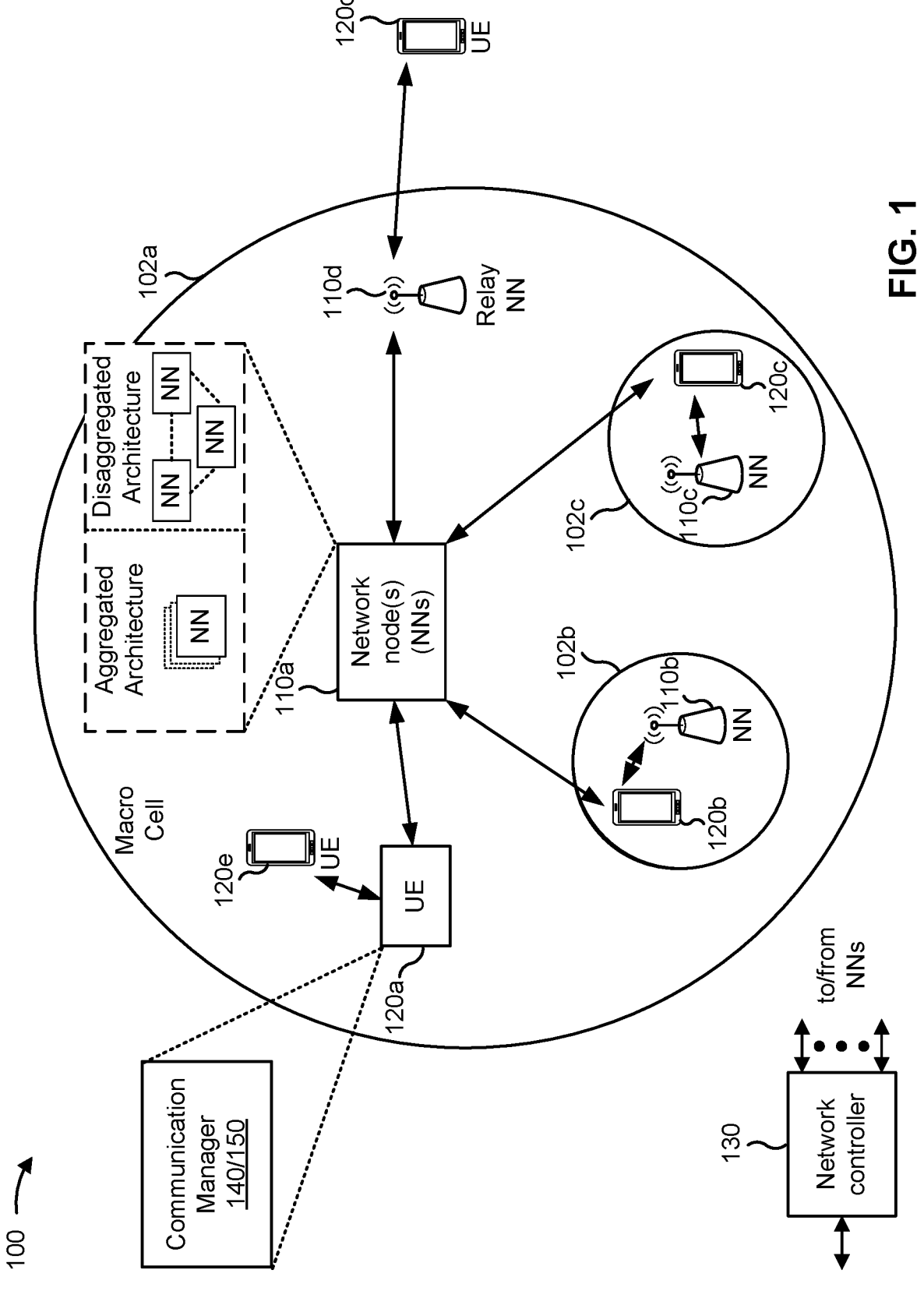
FIG. 1 is a diagram illustrating an example of a wireless network, in accordance with the present disclosure.

An application at a transmitter may generate information for consumption by an application at a receiver. For example, the information may include a unit of information that would benefit from being delivered to the receiver as an integrated unit after migrating through the transmitter's and receiver's network layers and radio access network (RAN) layers. To facilitate the delivery of a unit of information as an integrated unit (e.g., as opposed to handling different parts of the information independently and without consideration of the unit of information as a whole), a wireless communication technology (e.g., 5G/NR) may provide for protocol data units (PDUs) carrying the unit of information to be delivered as a PDU set. A PDU set may have common quality of service (QoS) attributes, such as a PDU set delay budget and a PDU set error rate. A PDU set may also be associated with various PDU set parameters, such as a PDU set importance parameter (indicating an importance level of the PDU set) or a PDU set integrated handling indication (PSIHI) (indicating whether the PDU set is an all-or-nothing PDU set or a non-all-or-nothing PDU set).

Various functions of the RAN protocol stack, such as packet data convergence protocol (PDCP) functions (e.g., buffered packet discard at the transmitter) and radio link control (RLC) functions (e.g., reassembly at the receiver) may be configured per protocol entity (e.g., per PDCP entity or per RLC entity). For example, a transmitter may perform PDCP discard operations for individual PDUs according to a PDCP discard timer of a PDCP entity of the transmitter. As another example, a receiver may perform RLC reassembly operations for individual PDUs according to a reassembly timer of an RLC entity of the receiver. However, handling of such operations on a per-entity basis (e.g., for individual PDUs) may not ensure proper handling of a PDU set such that the unit of information carried by the PDU set is successfully transmitted or received. For example, applying a PDCP discard timer at a per-entity granularity for individual PDUs may lead to a discrepancy between the length of the PDCP discard timer for a given PDU and a PDU set delay budget of the PDU set, causing dropped PDUs in jittery scenarios. As another example, applying a reassembly timer at a per-entity granularity for individual PDUs may cause PDUs having a high importance level (as indicated by a PDU set importance parameter) to be dropped equally quickly as PDUs having a low importance level, which may lead to failure to receive a PDU set.

Some techniques described herein provide configuration and/or performance of a protocol function, such as PDCP discard or RLC reassembly, at the granularity of a PDU set rather than an individual PDU. For example, a configuration of a PDCP discard timer at a transmitter may correspond to a particular PDU set parameter (e.g., a particular PSIHI or a particular PDU set importance parameter). As another example, a configuration of an RLC entity at a receiver may correspond to a PDU set parameter (e.g., a PDU set importance parameter). A transmitter may perform a PDCP discard operation for a PDU belonging to a PDU set according to the PDCP discard timer corresponding to the PDU set. Thus, the occurrence of dropped PDUs is reduced. A receiver may perform an RLC operation (e.g., reassembly) for a PDU belonging to a PDU set according to the RLC entity corresponding to a PDU set parameter of the PDU set. Thus, the likelihood of failure to receive a PDU set is reduced.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the transmitter may include a communication manager 140. As described in more detail elsewhere herein, the communication manager 140 may receive a configuration of one or more PDCP discard timers for PDU sets, the configuration indicating one or more PDU set parameters corresponding to the one or more PDCP discard timers; and communicate in accordance with the configuration. In some aspects, the communication manager 140 may receive a configuration indicating one or more PDU set parameters, the configuration indicating an RLC entity corresponding to a PDU set importance parameter of the one or more PDU set parameters; receive one or more PDUs of a PDU set, the PDU set being associated with the PDU set importance parameter; and process the one or more PDUs according to the RLC entity. Additionally, or alternatively, the communication manager 140 may perform one or more other operations described herein.

As indicated above, FIG. 1 is provided as an example. Other examples may differ from what is described with regard to FIG. 1.

Figure 2:
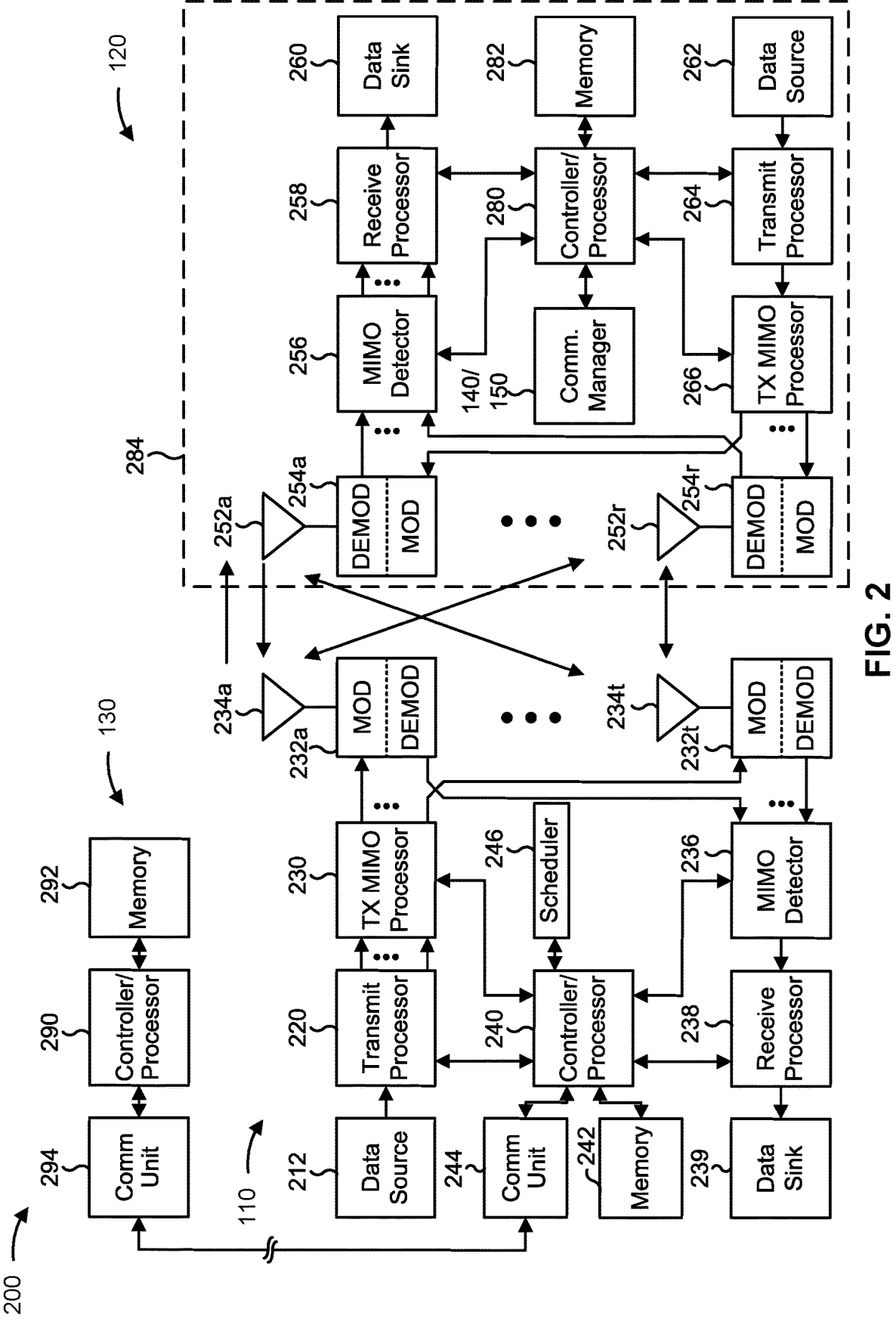
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the network node 110, the controller/processor 280 of the UE 120, and/or any other component(s) of FIG. 2 may perform one or more techniques associated with PDCP or RLC processing, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a configuration of one or more PDCP discard timers for PDU sets, the configuration indicating one or more PDU set parameters corresponding to the one or more PDCP discard timers; and/or means for communicating in accordance with the configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a configuration indicating one or more PDU set parameters, the configuration indicating an RLC entity corresponding to a PDU set importance parameter of the one or more PDU set parameters; means for receiving one or more PDUs of a PDU set, the PDU set being associated with the PDU set importance parameter; and/or means for processing the one or more PDUs according to the RLC entity. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
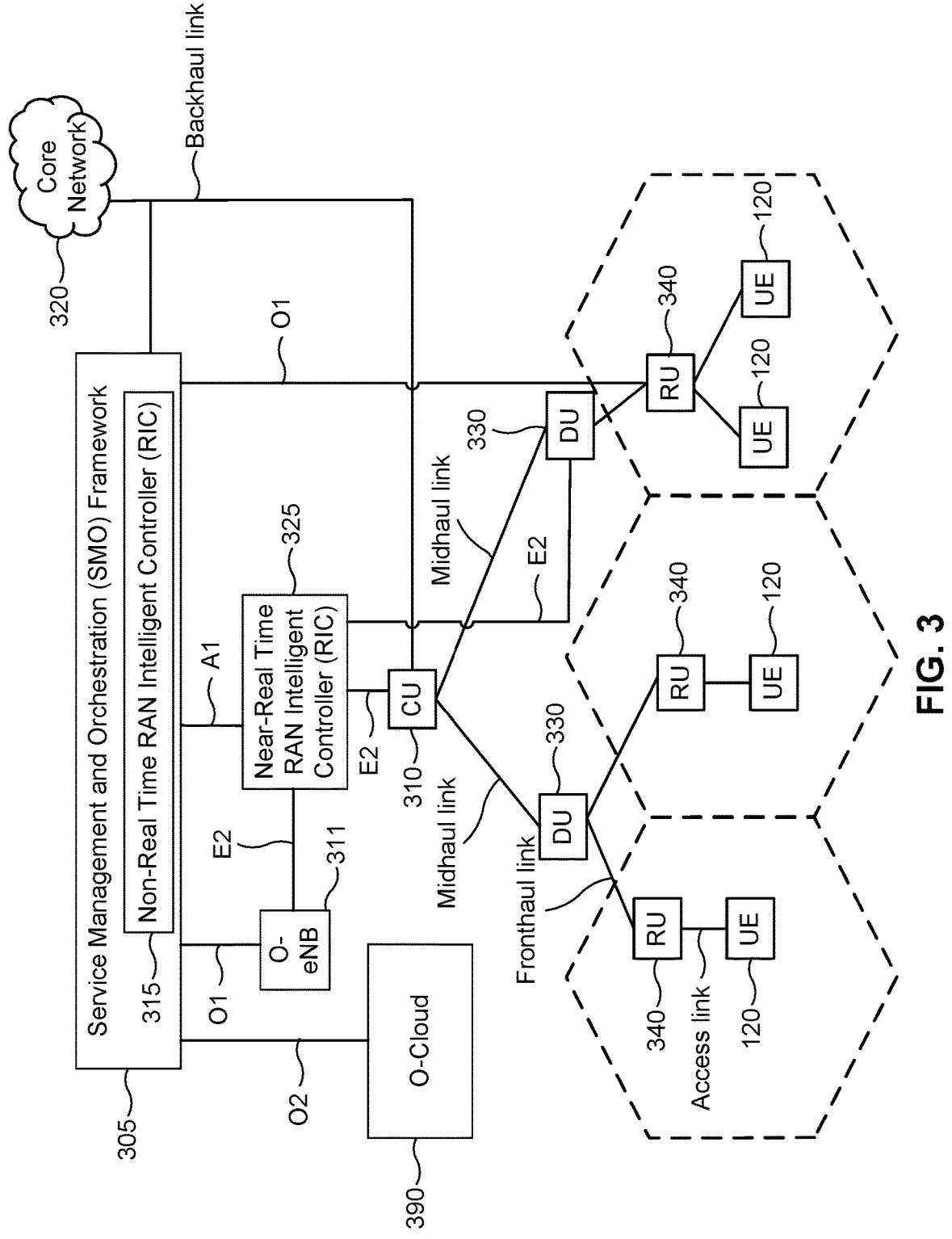
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
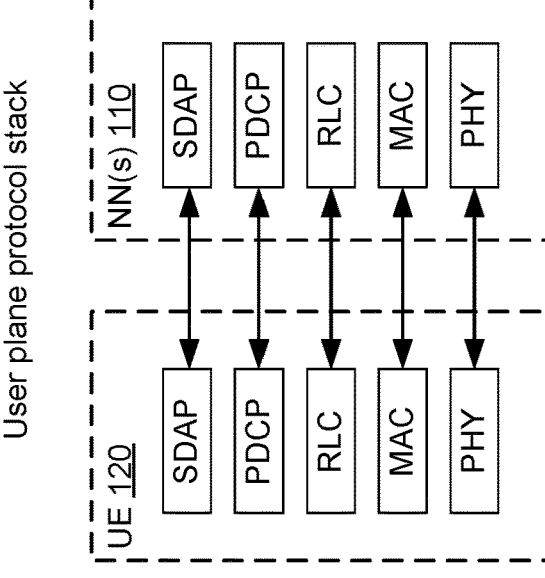
FIG. 4 is a diagram illustrating an example 400 of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the network node 110. On the control plane, the UE 120 and the network node 110 may include respective radio resource control (RRC) layers. Furthermore, the UE 120 may include a non-access stratum (NAS) layer in communication with an NAS layer of an access and management mobility function (AMF). The AMF may be associated with a core network associated with the network node 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN;

establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a PDCP discard timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

As mentioned, the PDCP layer (e.g., a PDCP entity) may be configured with a PDCP discard timer. A PDCP discard timer (sometimes indicated by a parameter such as discard-Timer of a PDCP-Config configuration) may indicate a length of time, such as in milliseconds (ms). At a transmitter (e.g., a UE 120 on the uplink or a network node 110 on the downlink), a PDCP entity may receive a packet, such as a PDCP SDU or a data packet, from a higher layer (e.g., RRC or SDAP). The PDCP entity may buffer the packet in a transmission buffer for up to the length of the PDCP discard timer. For example, the PDCP entity may buffer the packet in the transmission buffer until a status report is received by the transmitter indicating successful reception, or the PDCP discard timer expires. After the PDCP discard timer expires, the packet may be discarded (e.g., flushed, dropped, deleted from the buffer). In some examples, the PDCP discard timer may be configured per PDCP PDU, such that all data (e.g., packets, PDCP SDUs) of a given PDCP PDU are buffered until a status report indicating successful reception is received or the PDCP discard timer expires for the given PDCP PDU. Some techniques described herein provide for a PDCP discard timer to be configured and used per PDU set (e.g., PDCP PDU set), as described in more detail elsewhere herein.

The PDCP layer may provide data, in the form of PDCP PDUs, to the RLC layer via RLC channels. The RLC layer may handle transfer of upper layer (e.g., PDCP) PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

As mentioned, the RLC layer may handle reassembly of an SDU. Reassembly may be supported in unacknowledged mode and/or in acknowledged mode. At a transmitter (e.g., a network node 110 on the downlink or a UE 120 on the uplink), an RLC layer may segment higher-layer data (e.g., an RLC SDU) into a set of RLC PDUs, and may provide the set of RLC PDUs for transmission over the air interface. A receiver (e.g., a UE 120 on the downlink or a network node 110 on the uplink) may receive at least part of the set of RLC PDUs, and may store the set of RLC PDUs in a reassembly buffer. The receiver may attempt to reassemble the RLC SDU from the received RLC PDUs, referred to herein as "performing reassembly." The receiver may perform reassembly according to a reassembly timer, which may be configured as part of an RLC-Config configuration. The receiver may start the reassembly timer when a first RLC PDU of a new RLC SDU is received, and may reset the timer when all RLC PDUs of the RLC SDU have been received. If the reassembly timer expires before all RLC PDUs of the RLC SDU have been received, then the receiver may transmit a status report, which may trigger retransmission of a missed RLC PDU of the RLC SDU. The reassembly timer may be configured in connection with an RLC entity. Some techniques described herein may provide for an RLC entity to be configured to correspond to a PDU set parameter, such as a PDU set importance parameter, as described elsewhere herein.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into a set of RLC PDUs, and so on. In effect, the PDU carries at least part of the SDU as a payload.

Some techniques described herein relate to PDU sets. A PDU set includes one or more PDUs. The one or more PDUs may carry a payload of a unit of information generated at an application layer. As just one example, the unit of information may include a video frame or a slice within a video frame, such as may be generated by or consumed by an extended reality (XR) application. An application associated with a transmitter may provide such a unit of information to a network layer associated with the transmitter. The network layer may segment the unit of information into a set of PDUs of a PDU set (e.g., network PDUs), and may provide an indication (e.g., in each PDU of the PDU set) that the set of PDUs belong to a single PDU set. The PDU set may correspond to the unit of information. At the transmitter, the network layer may provide the set of PDUs to a RAN protocol stack, such as the user plane protocol stack of FIG. 4, for processing and transmission via the RAN, as described above. At the receiver, a RAN protocol stack (e.g., the user plane protocol stack described above) may receive wireless communications carrying PDUs (e.g., RLC PDUs) derived from the set of PDUs generated by the network layer. The RAN protocol stack may attempt to obtain the set of PDUs from the received wireless communications, and if successful, may provide the set of PDUs to a network layer of the receiver for provision to an application layer of the receiver as the unit of information. Thus, while the RAN stack of a transmitter or receiver may handle PDUs of the set of PDUs as individual PDUs, the RAN stack may have some indication that the set of PDUs belong to a PDU set. PDUs belonging to a PDU set may be associated with an indication that the PDUs belong to the PDU set, such as a PDU set sequence number.

All PDUs of a PDU set may share common QoS parameters, such as a PDU set delay budget (PSDB) and/or a PDU set error rate (PSER). The PSDB may indicate a time between reception of a first PDU of a PDU set and successful delivery of a last arrived PDU of the PDU set. The PSER may indicate an upper bound for a rate of PDU sets that have been processed by a sender of a link layer protocol but that are not successfully delivered by a corresponding receiver to an upper layer.

Some PDU sets may require the successful reception of all PDUs of the PDU set for the underlying unit of information to be deemed to be successfully recovered. For such a PDU set, if any PDU in the PDU set is lost, the unit of information of the PDU set may be deemed to be unrecoverable. Such a PDU set is referred to herein as an "all-or-nothing" PDU set.

On the other hand, in some examples, a unit of information may be recoverable from a PDU set if fewer than all PDUs of the PDU set are received or recovered. For example, the PDUs of the PDU set may be encoded using an encoding scheme that provides recovery from one or more dropped PDUs, such as application-layer forward error correction (FEC) encoding. FEC encoding provides for redundant information to the PDUs being transmitted in order to detect and correct errors that may occur during transmission. FEC works by adding redundant information in the form of check symbols to the original data, which can be used at the receiver to detect and correct errors. Depending on the redundancy ratio of the FEC encoding, only a proper subset of PDUs in the PDU set are needed by the application layer to decode the PDU set. Such a PDU set is referred to herein as a "non-all-or-nothing" PDU set. Whether a PDU set is an all-or-nothing PDU set or a non-all-or-nothing PDU set may be indicated by a PDU set parameter corresponding to the PDU set, referred to herein as a PDU set integrated handling indication (PSIHI). For example, the PSIHI may indicate whether all PDUs of a PDU set are needed for the usage of the PDU set (e.g., the underlying unit of information of the PDU set) by the application layer.

Different PDU sets may have different levels of importance. For example, decoding of a first PDU set (or multiple PDU sets) may depend on data included in a second PDU set (e.g., due to a video encoding or compression scheme associated with the underlying units of data of the first PDU set and the second PDU set). Due to this dependency, the second PDU set may be considered more important to the application layer than the first PDU set(s). An application (e.g., an application function) may indicate an importance level of a PDU set via a PDU set parameter referred to herein as a PDU set importance parameter. A PDU set associated with a higher importance level may be less likely to be discarded, in the event of congestion, than a PDU set associated with a lower importance level. A PDU set associated with a higher importance level may also be prioritized for scheduling, leading to a higher likelihood of satisfying a delivery deadline than a PDU set associated with a lower importance level. PDU set importance parameters can be mapped to importance levels in any suitable fashion. PDU sets associated with a same traffic flow and having different importance levels may be mapped to the same QoS flow, and may therefore have the same PSDB, PSER, and/or other QoS parameters (e.g., priority, guaranteed bit rate (GBR), maximum data burst volume (MDBV), etc.).

As indicated above, FIG. 4 is provided as an example. Other examples may differ from what is described with regard to FIG. 4.

Figure 5:
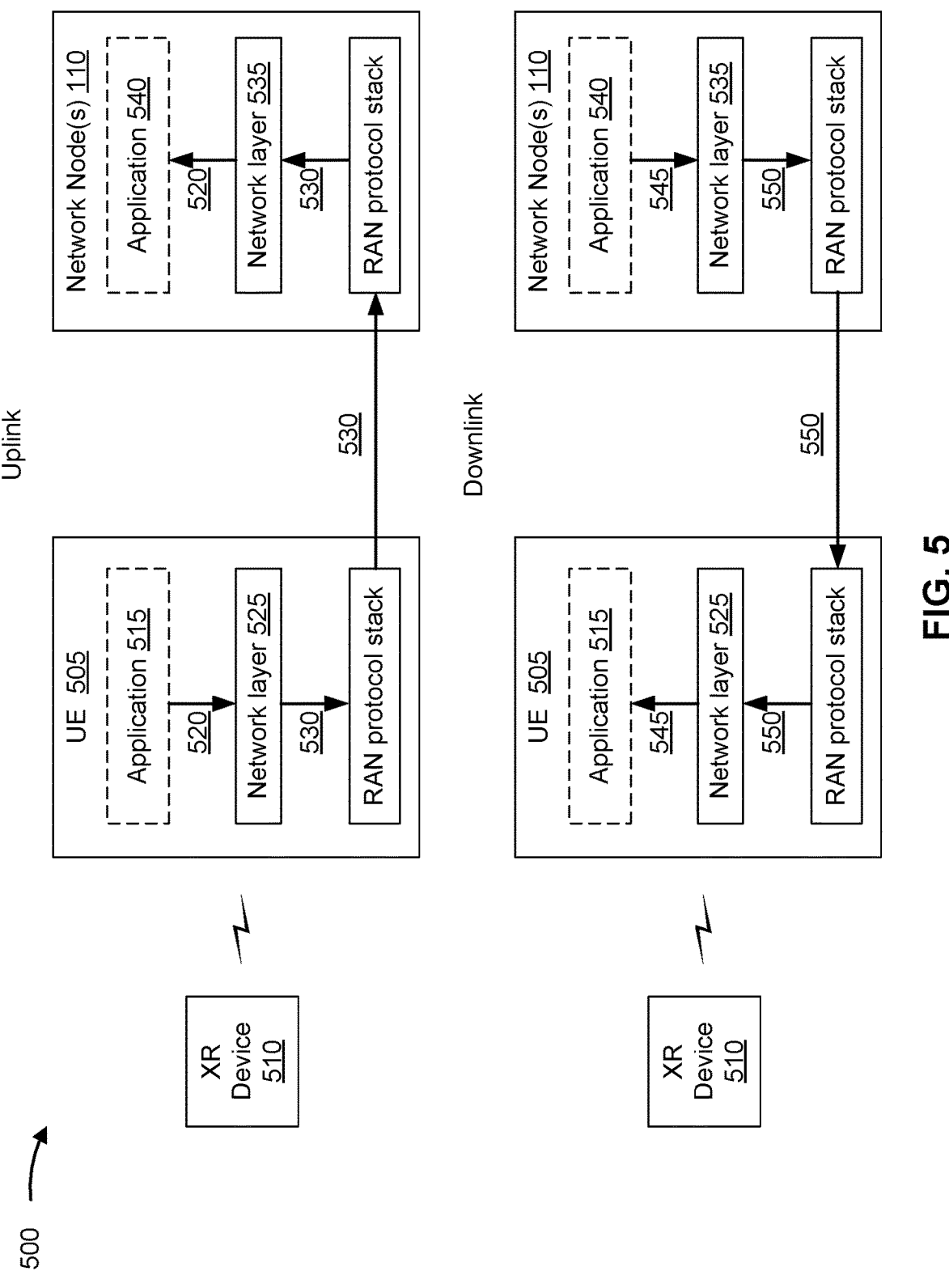
FIG. 5 is a diagram illustrating an example of a system including a UE, an extended reality (XR) device, and a network node, in accordance with the present disclosure.

FIG. 5 is a diagram illustrating an example 500 of a system including a UE 505 (e.g., UE 120), an XR device 510, and a network node 110, in accordance with the present disclosure. As shown, in example 500, the UE 505 is associated with (e.g., hosts, runs) an application 515. In some aspects, the application 515 may generate information, for example, based on information received from the XR device 510 (e.g., sensor data, video data, user input, feedback), content to be consumed (e.g., displayed, provided, output) by the XR device 510, or the like. In some aspects, the application 515 may be associated with (e.g., run at, be hosted at) the XR device 510.

The XR device 510 may provide an XR environment and/or facilitate interaction relating to an XR environment. "XR" may refer to all real-and-virtual combined environments and human-machine interactions generated by computer technology and wearables (such as XR device 510). XR is an umbrella term, which may include virtual reality (VR), augmented reality (AR), mixed reality (MR), and/or other terms. VR is a rendered version of a delivered visual and audio scene. The rendering may be designed to mimic the visual and audio sensory stimuli of the real world to an observer or user as the observer or user moves within the limits defined by the application. VR may be provided via XR device 510 comprising a head mounted display (HMD), which may replace the user's field of view with a simulated visual component and headphones, to provide the user with the accompanying audio. Some form of head and motion tracking of the user in VR may allow the simulated visual and audio components to be updated in order to ensure that, from the user's perspective, items and sound sources remain consistent with the user's movements. In AR, a user is provided with additional information or artificially generated items or content overlaid upon the user's current environment. Such additional information or content may be visual and/or auditory and the user's observation of the user's current environment may be direct, with no intermediate sensing, processing and rendering, or indirect, where the user's perception of the user's environment is relayed via sensors and may be enhanced or processed. MR is a form of AR in which some virtual elements are inserted into the physical scene with the intent to provide the illusion that these elements are part of the actual scene. The XR device 510 may include a wearable device (e.g., an HMD), a processor associated with an HMD, a sensor, or the like.

In some aspects, the UE 505 and the XR device 510 may be co-located. For example, the UE 505 and the XR device 510 may have a hardware interface with one another, which may provide ideal or near-ideal communication between the UE 505 and the XR device 510 (e.g., low or no latency, low or no jitter). In some other aspects, the UE 505 and the XR device 510 may not be co-located, meaning that there may be a wireless connection (referred to as a "tether") between the UE 505 and the XR device 510. The tether may be implemented using WiFi, Bluetooth, BL, a PC5 interface, or another suitable radio technology. In some aspects, the tether may be non-ideal, meaning the tether may be associated with non-negligible latency, non-negligible jitter (e.g., uncertainty in an arrival time and/or arrival order of packets), or the like. In some aspects, the network node 110 may not be aware of whether the UE 505 and the XR device 510 are co-located or not. For example, the presence or absence of the tether may be transparent to the network node 110, and the presence or absence of the tether may impact expectations regarding jitter, latency, or the like, as described elsewhere herein.

On the uplink, the UE 505 may receive information 520 from the application 515 (e.g., directly if the application 515 is implemented at the UE 505, or via the tether if the application 515 is implemented at the XR device 510). The UE 505 may provide the information 520 to a network layer 525 of the UE 505, which may provide the information 520 to a RAN protocol stack of the UE 505 (as described in connection with FIG. 4) in the form of a PDU set 530. The RAN protocol stack of the UE 505 may process PDUs of the PDU set 530, and may transmit a communication carrying the PDU set 530 to the network node 110. A RAN protocol stack of the network node 110 (as described in connection with FIG. 4) may process the communication carrying the PDU set 530 to attempt to obtain the PDU set 530 for a network layer 535 of the network node 110. If successful, the network layer 535 may reconstruct the information 520 from the PDU set 530, and may provide the information 520 to an application 540 of the network node 110. On the other hand, the network node 110 may fail to obtain the PDU set 530 for various reasons, in which case the network node 110 may attempt to obtain a retransmission of the communication carrying the PDU set 530, or may provide an indication of the failure to obtain the PDU set 530. For uplink transmission, the UE may be referred to as a transmitter, and the network node 110 may be referred to as a receiver.

On the downlink, the network node 110 may receive information 545 from the application 540. The network node 110 may provide the information 545 to the network layer 535, which may provide the information 545 to a RAN protocol stack of the network node 110 in the form of a PDU set 550. The RAN protocol stack of the network node 110 may process PDUs of the PDU set 550, and may transmit a communication carrying the PDU set 550 to the UE 505. A RAN protocol stack of the UE 505 may process the communication carrying the PDU set 550 to attempt to obtain the PDU set 550 for a network layer 525 of the UE 505. If successful, the network layer 525 may reconstruct the information 545 from the PDU set 550, and may provide the information 545 to an application 515 of the UE 505 or the XR device 510. The UE 505 may fail to obtain the PDU set 550 for various reasons, in which case the UE 505 may attempt to obtain a retransmission of the communication carrying the PDU set 550, or may provide an indication of the failure to obtain the PDU set 550. For uplink transmission, the UE may be referred to as a transmitter, and the network node 110 may be referred to as a receiver.

As indicated above, FIG. 5 is provided as an example. Other examples may differ from what is described with regard to FIG. 5.

Figure 6:
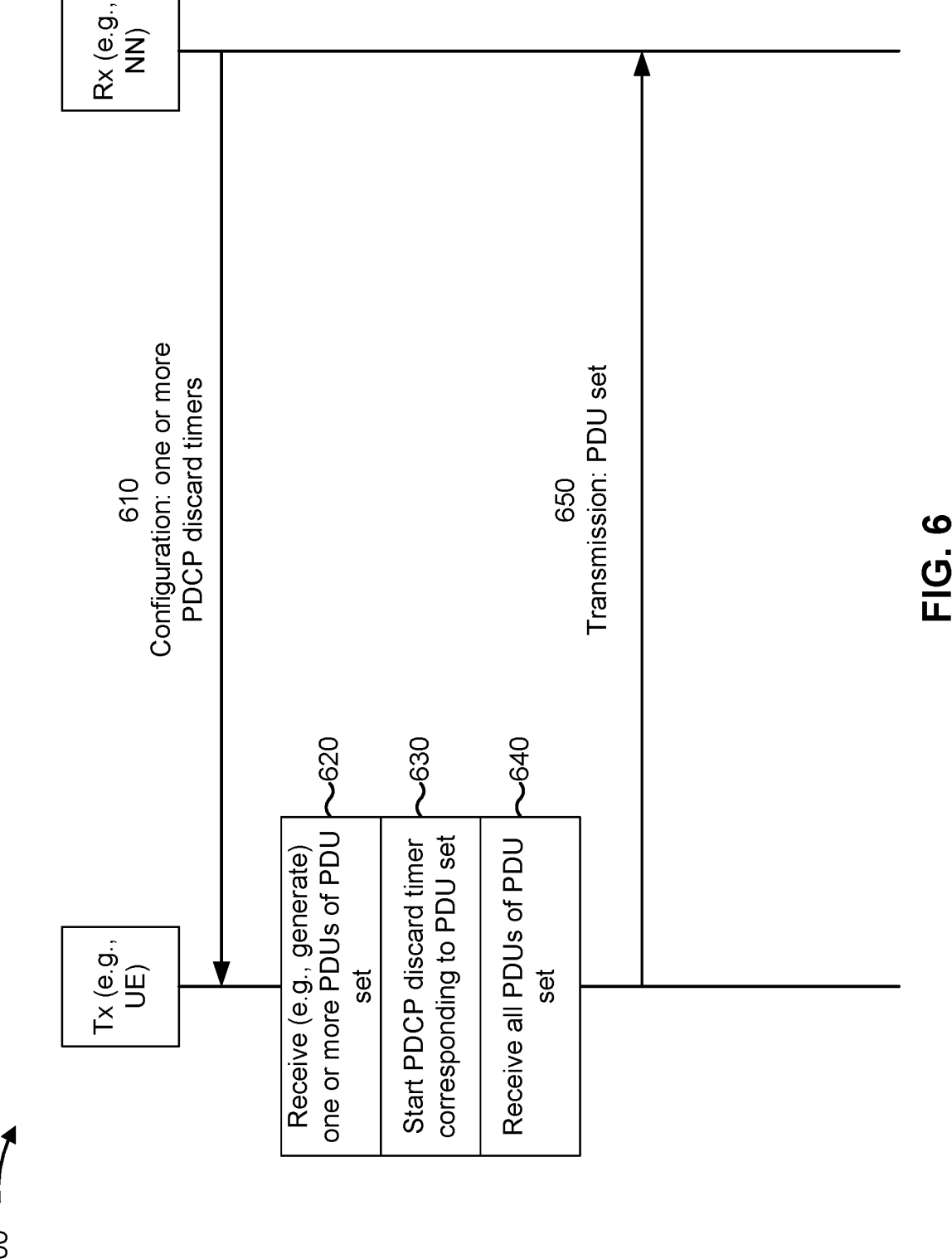
FIG. 6 is a diagram illustrating an example of signaling associated with a packet data convergence protocol (PDCP) discard time for a protocol data unit (PDU) set, in accordance with the present disclosure.

FIG. 6 is a diagram illustrating an example 600 of signaling associated with a PDCP discard time for a PDU set, in accordance with the present disclosure. Example 600 includes a transmitter and a receiver. Example 600 can be an example of uplink transmission (in which the transmitter is a UE 120 or a UE 505 and the receiver is a network node 110) or downlink transmission (in which the transmitter is a network node 110 and the receiver is a UE 120 or a UE 505). In example 600 as illustrated, the transmitter is a UE (e.g., a UE 120 or a UE 505) and the receiver is a network node (NN) (e.g., a network node 110), meaning that example 600 is illustrated as an example of uplink transmission of a PDU set.

As shown by reference number 610, the receiver may output, and the transmitter may receive, a configuration. In the case of downlink communication, the transmitter may output the configuration and the receiver may receive the configuration. The configuration may include radio resource control (RRC) information, medium access control (MAC) information, downlink control information (DCI), or a combination thereof.

The configuration may include a configuration of one or more PDCP discard timers. For example, the configuration may include a PDCP-Config configuration. In some aspects, the PDU discard timer may apply to a PDU set. For example, the PDU discard timer may start upon reception (e.g., generation, reception from an application 515, etc.), at the transmitter, of a first PDU of the PDU set, and may run for a length of the PDU discard timer. If all PDUs of the PDU set have not been received by a PDCP entity of the transmitter before expiration of the timer, the transmitter may discard the PDU set, or may provide one or more received PDUs of the PDU set, as described elsewhere herein. If the PDCP entity receives all PDUs of the PDU set before expiration of the timer, the PDCP entity may provide the PDU set to lower layers of the transmitter for transmission. By applying the PDCP discard timer at the granularity of a PDU set (as compared to the granularity of an individual PDU), the effects of jitter on a tether between the transmitter and an XR device (e.g., XR device 510) associated with the transmitter are mitigated. For example, if the PDCP discard timer is applied for an individual PDU of the PDU set, the individual PDU may be discarded before the arrival of other PDUs of the PDU set (e.g., due to jitter on the tether affecting the arrival times of PDUs of the PDU set), even though the individual PDU is subject to a PSDB of the PDU set rather than a packet delay budget (PDB) specific to the individual PDU. Discarding the individual PDU may lead to loss of the entire PDU set (for an all-or-nothing PDU set) and/or loss of one or more PDUs of the PDU set (for a non-all-or-nothing PDU set), thereby decreasing reliability and increasing latency. By applying the PDCP discard timer at the granularity of a PDU set (as compared to the granularity of an individual PDU), the effects of jitter on the tether between the transmitter and an XR device (e.g., XR device 510) associated with the transmitter are mitigated, since an individual PDU will not be discarded until the PDCP discard timer for the entire PDU set (which may, in some aspects, be equal to or based on the PSDB of the PDU set) has expired.

In some aspects, the configuration may indicate a PDU set parameter corresponding to a PDCP discard timer. For example, the configuration may indicate that the PDCP discard timer is to be used for PDU sets that are associated with the PDU set parameter. In some aspects, the PDU set parameter may include a PSDB. For example, the configuration may indicate a PDCP discard timer corresponding to the PSDB. In some examples, the PDCP discard timer may be equal in length to the PSDB, which may reduce the likelihood that an individual PDU of a PDU set is discarded before the PSDB has expired.

In some aspects, the configuration may indicate a PDU set importance parameter and a PDCP discard timer corresponding to the PDU set importance parameter. For example, the PDU set parameter to which the PDCP discard timer corresponds may be a PDU set importance parameter. As another example, the configuration may indicate a plurality of PDCP discard timers, and each PDCP discard timer may correspond to a different PDU set importance parameter (which may be indicated by the configuration). As yet another example, the configuration may indicate a threshold, and a PDCP discard timer may apply for PDU sets associated with a PDU set importance parameter that satisfies the threshold. For example, a first PDCP discard timer may apply for PDU sets associated with the PDU set importance parameter that satisfies the threshold, and a second PDCP discard timer may apply for PDU sets associated with a PDU set importance parameter that fails to satisfy the threshold. In some aspects, the configuration may indicate a longer PDCP discard timer for a PDCP set importance parameter indicating a higher importance value, and/or a shorter PDCP discard timer (e.g., shorter than the longer PDCP discard timer) for a PDCP set importance parameter indicating a lower importance value (e.g., lower than the higher importance value). Thus, a PDU set with a higher importance value (such as may be used for the decoding of other PDU sets with lower importance values) may be more likely to be successfully received and not discarded, which may reduce impact on the operation of the application 515 relative to if a shorter PDCP discard timer is used for a PDU set with a higher importance value. On the other hand, when a PDU set of a low importance value arrives late (e.g., is not provided from the PDCP buffer until after expiration of the PDCP discard timer), the PDU set can be discarded according to the shorter PDCP discard timer with minimal impact on the application 515, thereby conserving buffer space.

As shown by reference number 620, the transmitter may receive (e.g., generate) one or more PDUs of a PDU set. For example, a PDCP layer of the transmitter may receive one or more PDCP SDUs carrying information of the one or more PDUs, such as from a network layer of the transmitter, an SDAP layer of the transmitter, or the like. As shown by reference number 630, the transmitter may start a PDCP discard timer corresponding to the PDU set (e.g., based at least in part on information indicating that the one or more PDCP SDUs carry information belonging to one or more PDUs of the PDU set). For example, the transmitter may start a PDCP discard timer configured by the configuration shown by reference number 610. In some aspects, the PDCP discard timer may correspond to a PDU set parameter of the PDU set, such as a PSIHI or a PDU set importance parameter. Additionally, or alternatively, the PDCP discard timer may correspond to a QoS parameter of the PDU set, such as a PSDB. As shown by reference number 640, in example 600, the transmitter receives all PDUs of the PDU set. Accordingly, as shown by reference number 650, the transmitter transmits a set of communications carrying the PDUs of the PDU set (referred to herein as "communicating in accordance with the configuration").

In some aspects, the transmitter may not receive one or more PDUs of the PDU set. For example, the PDCP entity of the transmitter may fail to receive one or more PDCP SDUs carrying the one or more PDUs before expiry of a PDCP discard timer corresponding to the PDU set. In this example, the transmitter may discard, upon expiry of the PDCP discard timer, the one or more PDUs (referred to herein as communicating in accordance with the configuration). In some aspects, the transmitter may discard the one or more PDUs based at least in part on a PSIHI of the PDU set. For example, the transmitter may discard all PDUs of the PDU set based at least in part on the PSIHI indicating that the PDU set is an all-or-nothing PDU set. In this context, "all PDUs" may include PDUs of the PDU set that have not yet been received by the transmitter, PDUs of the PDU set in a transmitter buffer that have not been submitted to lower layers for transmission, and PDUs of the PDU set that have already been submitted to lower layers, which reduces transmit resource utilization relative to transmitting PDUs of the PDU set that have already been submitted to lower layers, since these PDUs are not usable at the receiver either way. As another example, the transmitter may discard only the one or more PDUs (e.g., PDUs that have not yet been received), and any PDUs that have been received and not yet submitted to a lower layer, based at least in part on the PSIHI indicating that the PDU set is not an all-or-nothing PDU set (e.g., the PSIHI indicating that the PDU set is a non-all-or-nothing PDU set, such as a PDU set encoded using application layer FEC). Thus, efficiency of communication for all-or-nothing PDU sets is improved by cancelling an entire PDU set when any PDU of the PDU set is missed, while the function of FEC-encoded PDU sets is improved by reducing the likelihood of an unnecessary reduction to data rate of the FEC encoding.

As shown, the receiver may receive and process the communication, as described in more detail, for example, in connection with FIGS. 4 and 5. In some aspects, the receiver may perform one or more of the operations described with regard to FIG. 7, below.

As indicated above, FIG. 6 is provided as an example. Other examples may differ from what is described with regard to FIG. 6.

Figure 7:
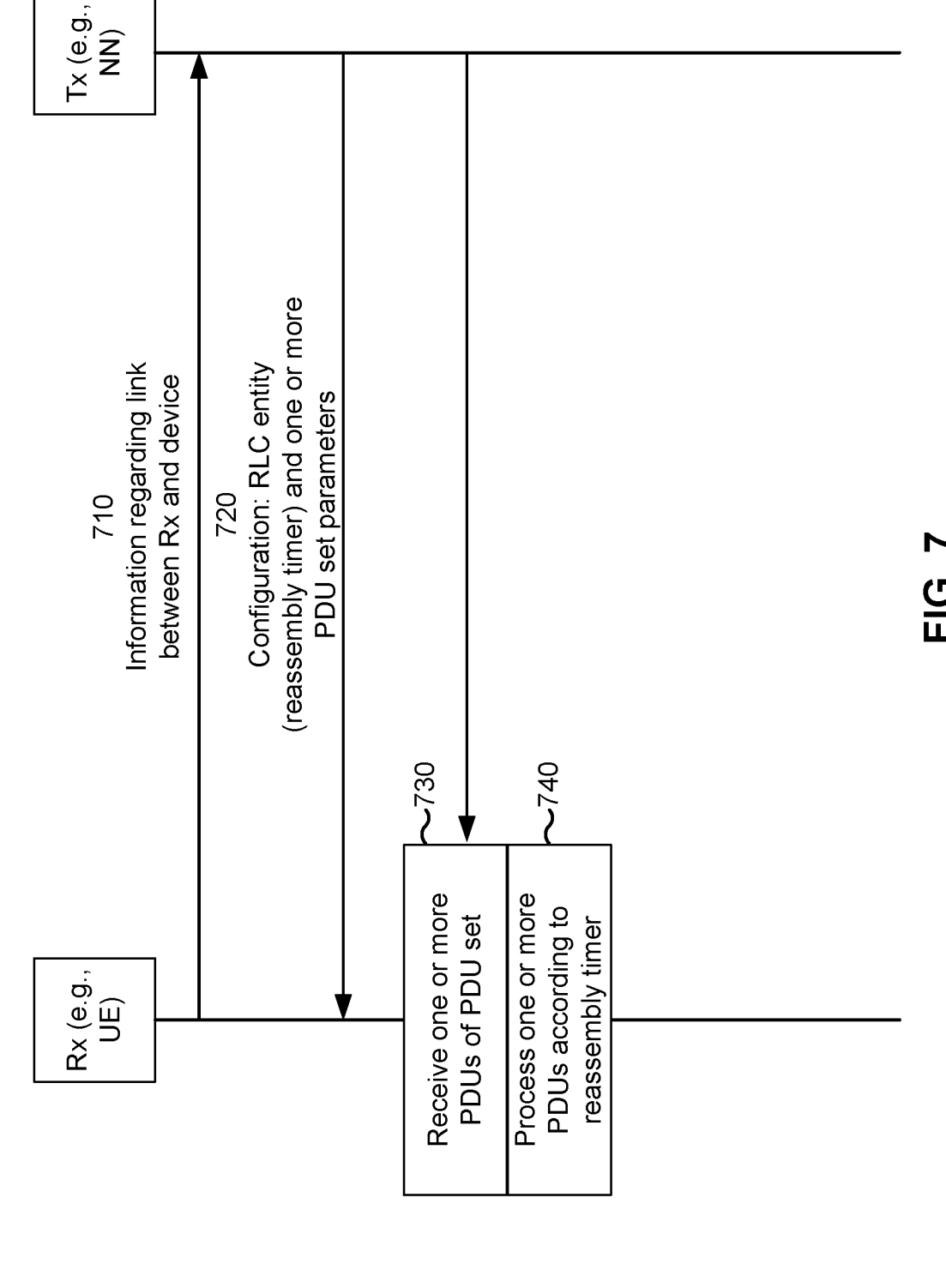
FIG. 7 is a diagram illustrating an example of signaling associated with a retransmission timer for a PDU set, in accordance with the present disclosure.

FIG. 7 is a diagram illustrating an example 700 of signaling associated with a retransmission timer for a PDU set, in accordance with the present disclosure. Example 700 includes a transmitter and a receiver. Example 700 can be an example of uplink transmission (in which the transmitter is a UE 120 or a UE 505 and the receiver is a network node 110) or downlink transmission (in which the transmitter is a network node 110 and the receiver is a UE 120 or a UE 505). In example 700 as illustrated, the transmitter is a network node 110 and the receiver is a UE 120, meaning that example 700 is illustrated as an example of downlink transmission of a PDU set.

As shown by reference number 710, the receiver may output, and the transmitter may receive, information regarding a link (e.g., a tether) between the receiver and a device associated with the receiver, such as an XR device (e.g., XR device 510). For example, the information may include assistance information. The information regarding the link may indicate whether the receiver and the device are co-located (e.g., whether the link is ideal or non-ideal), or may indicate one or more parameters of the link. The one or more parameters may include, for example, a delay parameter (e.g., an average delay, a maximum delay, a minimum delay, a standard deviation of a delay), a jitter parameter (e.g., an average jitter, a maximum jitter, a minimum jitter, a standard deviation of a jitter, etc.), information indicating whether an application (e.g., the application 515) runs on the receiver or the device, or a combination thereof. In some aspects, the transmitter may configure an RLC entity based at least in part on the information regarding the link. For example, if the transmitter does not know whether an application is co-located with the receiver or on a tethered device, the transmitter may misconfigure an RLC timer and/or relax scheduling by the network, leading to an unintended increase in latency at the application. By configuring the RLC entity based at least in part on the information regarding the link, the transmitter may take into account delay and/or jitter at the link (e.g., by lengthening an RLC timer), thus reducing the occurrence of expiration of the RLC timer and failure of reception for the application.

As shown by reference number 720, the transmitter may output, and the receiver may receive, a configuration. In the case of uplink communication, the receiver may output the configuration and the transmitter may receive the configuration. The configuration may include RRC information, MAC information, DCI, or a combination thereof.

The configuration may indicate an RLC entity. For example, the configuration may include configuration information defining a set of parameters of an RLC entity to perform RLC functions for received or transmitted traffic of the receiver. In some aspects, the configuration may indicate one or more PDU set parameters, such as a PSIHI, a PDU set importance parameter, or the like. In some aspects, the RLC entity may correspond to a PDU set parameter of the one or more PDU set parameters. For example, a parameter of the RLC entity (e.g., a reassembly timer indicated by a t-Reassembly parameter of an RLC-Config configuration) may be mapped to a particular PDU set parameter, such that the parameter of the RLC entity is used for RLC layer processing of PDU sets having the particular PDU set parameter. As a particular example, different timers (e.g., different reassembly timers) may be configured for different PDU set importance parameters. For example, a longer reassembly timer may be configured for a PDU set with a higher PDU set importance parameter, and a shorter reassembly timer (shorter than the longer reassembly timer) may be configured for a PDU set with a lower PDU set importance parameter (lower than the higher PDU set importance parameter). In some aspects, the longer reassembly timer may be longer than a length of a delay budget assigned to a radio access link between the transmitter and the receiver (e.g., a Uu link), which improves the likelihood that PDU sets with a higher PDU set importance parameter are successfully received. For example, the longer reassembly timer may be longer than the length of the delay budget assigned to the radio access link based at least in part on the higher PDU set importance parameter indicating a threshold importance level. In some aspects, the configuration is based at least in part on information regarding the link between the receiver and the device, as described above.

As shown by reference number 730, the transmitter may transmit, and the receiver may receive, one or more PDUs of a PDU set. The PDU set may be associated with the PDU set importance parameter. For example, the one or more PDUs may include an indication of the PDU set importance parameter (e.g., the transmitter may include a PDU set importance parameter in a PDU set header of the one or more PDUs or the PDU set).

As shown by reference number 740, the receiver may process the one or more PDUs according to the reassembly timer. For example, the receiver may start the reassembly timer corresponding to the PDU set (e.g., based at least in part on the PDU set importance parameter of the PDU set corresponding to the reassembly timer) when a first RLC PDU of a new RLC SDU (e.g., the PDU set) is received. If the reassembly timer expires before all RLC PDUs of the RLC SDU have been received, then the receiver may transmit a status report, which may trigger retransmission of a missed RLC PDU of the RLC SDU. In some aspects, the receiver may successfully receive the PDU set. The receiver may provide the PDU set to an application (e.g., application 515) and/or a device (e.g., XR device 510).

In some aspects, the receiver may discard one or more PDUs of the PDU set based at least in part on the reassembly timer and a PSIHI of the PDU set. For example, the receiver may discard all PDUs of the PDU set (e.g., PDUs of the PDU set in the UE's RLC buffer, and/or the UE's PDCP buffer if PDCP in-sequence delivery is configured) upon expiration of the reassembly timer based at least in part on the PSIHI of the PDU set indicating that the PDU set is an all-or-nothing PDU set. As another example, the receiver may discard only one or more unreceived PDUs of the PDU set upon expiration of the reassembly timer based at least in part on a PSIHI of the PDU set indicating that the PDU set is not an all-or-nothing PDU set. Thus, the receiver may conserve buffer resources when one or more PDUs of an all-or-nothing PDU set are dropped, and may improve reliability of PDU set transmission when the PDU set is not an all-or-nothing PDU set (e.g., when the PDU set uses FEC encoding).

As indicated above, FIG. 7 is provided as an example. Other examples may differ from what is described with regard to FIG. 7.

FIG. 8 is a diagram illustrating an example process 800 performed, for example, by a transmitter, in accordance with the present disclosure. Example process 800 is an example where the transmitter (e.g., UE 120, UE 505, the transmitter of FIG. 6) performs operations associated with protocol-data-unit-set-based discarding or processing.

As shown in FIG. 8, in some aspects, process 800 may include receiving a configuration of one or more PDCP discard timers for PDU sets, the configuration indicating one or more PDU set parameters corresponding to the one or more PDCP discard timers (block 810). For example, the transmitter (e.g., using reception component 1002 and/or communication manager 1006, depicted in FIG. 10) may receive a configuration of one or more PDCP discard timers for PDU sets, the configuration indicating one or more PDU set parameters corresponding to the one or more PDCP discard timers, as described above, for example, in connection with reference number 610 of FIG. 6.

As further shown in FIG. 8, in some aspects, process 800 may include communicating in accordance with the configuration (block 820). For example, the transmitter (e.g., using reception component 1002, transmission component 1004, and/or communication manager 1006, depicted in FIG. 10) may communicate in accordance with the configuration, as described above, for example, in connection with reference number 640 of FIG. 6.

Process 800 may include additional aspects, such as any single aspect or any combination of aspects described below and/or in connection with one or more other processes described elsewhere herein.

In a first aspect, the one or more PDCP discard timers include a first PDCP discard timer for a first PDU set importance parameter of the one or more PDU set parameters, and a second PDCP discard timer for a second PDU set importance parameter of the one or more PDU set parameters.

In a second aspect, alone or in combination with the first aspect, communicating in accordance with the configuration further comprises discarding, upon expiry of a PDCP discard timer of the one or more PDCP discard timers, one or more PDUs of a PDU set based at least in part on a PSIHI of the PDU set.

In a third aspect, alone or in combination with one or more of the first and second aspects, discarding the one or more PDUs comprises discarding all PDUs of the PDU set based at least in part on the PSIHI indicating that the PDU set is an all-or-nothing PDU set.

In a fourth aspect, alone or in combination with one or more of the first through third aspects, discarding the one or more PDUs comprises discarding the one or more PDUs of the PDU set, and not one or more other PDUs of the PDU set, based at least in part on the PSIHI indicating that the PDU set is not an all-or-nothing PDU set.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a receiver, in accordance with the present disclosure. Example process 900 is an example where the receiver (e.g., UE 120, UE 505, the receiver of FIG. 7) performs operations associated with protocol-data-unit-set-based processing.

As shown in FIG. 9, in some aspects, process 900 may include receiving a configuration indicating one or more protocol data unit (PDU) set parameters, the configuration indicating a radio link control (RLC) entity corresponding to a PDU set importance parameter of the one or more PDU set parameters (block 910). For example, the receiver (e.g., using reception component 1002 and/or communication manager 1006, depicted in FIG. 10) may receive a configuration indicating one or more PDU set parameters, the configuration indicating an RLC entity corresponding to a PDU set importance parameter of the one or more PDU set parameters, as described above.

As further shown in FIG. 9, in some aspects, process 900 may include receiving one or more PDUs of a PDU set, the PDU set being associated with the PDU set importance parameter (block 920). For example, the receiver (e.g., using reception component 1002 and/or communication manager 1006, depicted in FIG. 10) may receive one or more PDUs of a PDU set, the PDU set being associated with the PDU set importance parameter, as described above.

As further shown in FIG. 9, in some aspects, process 900 may include processing the one or more PDUs according to the RLC entity (block 930). For example, the receiver (e.g., using communication manager 1006, depicted in FIG. 10) may process the one or more PDUs according to the RLC entity, as described above.

Process 900 may include additional aspects, such as any single aspect or any combination of aspects described below and/or in connection with one or more other processes described elsewhere herein.

In a first aspect, the RLC entity indicates a reassembly timer for the PDU set importance parameter.

In a second aspect, alone or in combination with the first aspect, processing the one or more PDUs further comprises discarding all PDUs of the PDU set upon expiration of the reassembly timer based at least in part on a PSIHI of the PDU set indicating that the PDU set is an all-or-nothing PDU set.

In a third aspect, alone or in combination with one or more of the first and second aspects, processing the one or more PDUs further comprises discarding only one or more unreceived PDUs of the PDU set upon expiration of the reassembly timer based at least in part on a PSIHI of the PDU set indicating that the PDU set is not an all-or-nothing PDU set.

In a fourth aspect, alone or in combination with one or more of the first through third aspects, the reassembly timer is longer than a delay budget of a radio access link between the receiver and a transmitter of the PDU set based at least in part on the PDU set importance parameter indicating a threshold importance level.

In a fifth aspect, alone or in combination with one or more of the first through fourth aspects, process 900 includes transmitting information indicating one or more delay parameters or one or more jitter parameters of a link between the receiver and a device associated with the receiver.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
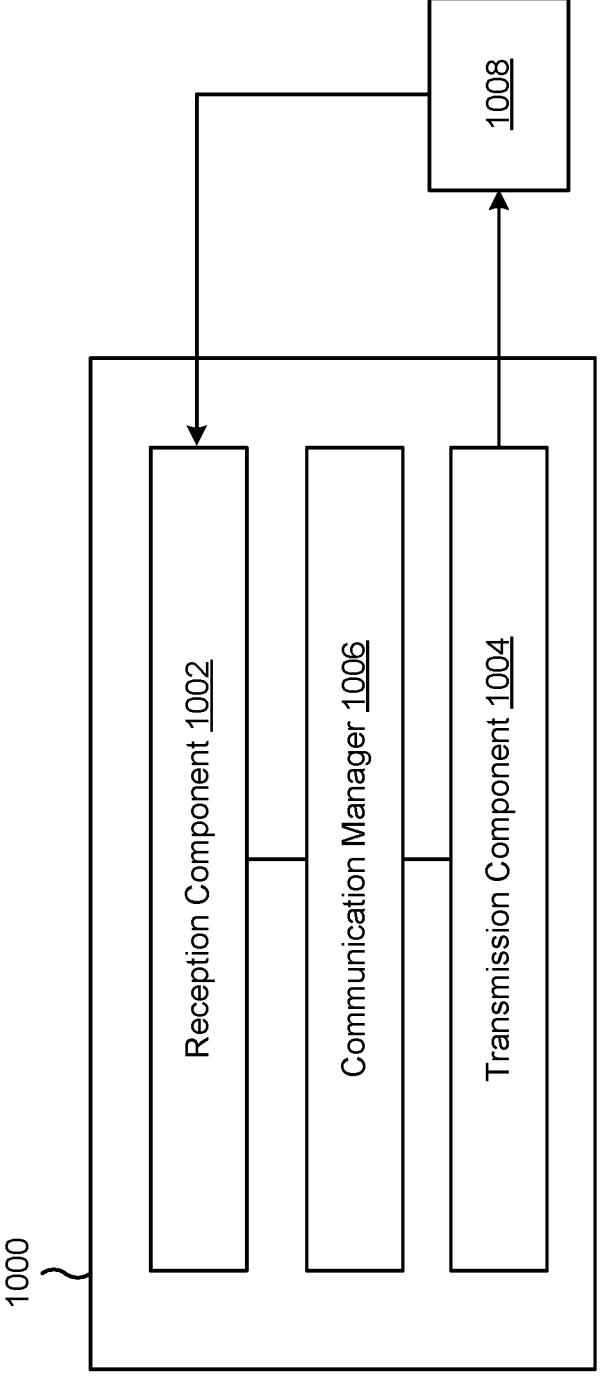
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004. In some aspects, the apparatus 1000 may include a transmitter, such as the transmitter of FIG. 6. In some aspects, the apparatus 1000 may include a receiver, such as the receiver of FIG. 7.

In some aspects, the apparatus 1000 may be configured to perform one or more operations described herein in connection with FIGS. 4-7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a configuration of one or more PDCP discard timers for PDU sets, the configuration indicating one or more PDU set parameters corresponding to the one or more PDCP discard timers. The reception component 1002 and/or the transmission component 1004 may communicate in accordance with the configuration.

The reception component 1002 may receive a configuration indicating one or more PDU set parameters, the configuration indicating an RLC entity corresponding to a PDU set importance parameter of the one or more PDU set parameters. The reception component 1002 may receive one or more PDUs of a PDU set, the PDU set being associated with the PDU set importance parameter. The communication manager 1006 may process the one or more PDUs according to the RLC entity.

The transmission component 1004 may transmit information indicating one or more delay parameters or one or more jitter parameters of a link between the receiver and a device associated with the receiver.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a transmitter, comprising: receiving a configuration of one or more packet data convergence protocol (PDCP) discard timers for protocol data unit (PDU) sets, the configuration indicating one or more PDU set parameters corresponding to the one or more PDCP discard timers; and communicating in accordance with the configuration.

Aspect 2: The method of Aspect 1, wherein the one or more PDCP discard timers include a first PDCP discard timer for a first PDU set importance parameter of the one or more PDU set parameters, and a second PDCP discard timer for a second PDU set importance parameter of the one or more PDU set parameters.

Aspect 3: The method of any of Aspects 1-2, wherein communicating in accordance with the configuration further comprises discarding, upon expiry of a PDCP discard timer of the one or more PDCP discard timers, one or more PDUs of a PDU set based at least in part on a PDU set integrated handling indication (PSIHI) of the PDU set.

Aspect 4: The method of Aspect 3, wherein discarding the one or more PDUs comprises discarding all PDUs of the PDU set based at least in part on the PSIHI indicating that the PDU set is an all-or-nothing PDU set.

Aspect 5: The method of Aspect 3, wherein discarding the one or more PDUs comprises discarding the one or more PDUs of the PDU set, and not one or more other PDUs of the PDU set, based at least in part on the PSIHI indicating that the PDU set is not an all-or-nothing PDU set.

Aspect 6: A method of wireless communication performed by a receiver, comprising: receiving a configuration indicating one or more protocol data unit (PDU) set parameters, the configuration indicating a radio link control (RLC) entity corresponding to a PDU set importance parameter of the one or more PDU set parameters; receiving one or more PDUs of a PDU set, the PDU set being associated with the PDU set importance parameter; and processing the one or more PDUs according to the RLC entity.

Aspect 7: The method of Aspect 6, wherein the RLC entity indicates a reassembly timer for the PDU set importance parameter.

Aspect 8: The method of Aspect 7, wherein processing the one or more PDUs further comprises discarding all PDUs of the PDU set upon expiration of the reassembly timer based at least in part on a PDU set integrated handling indication (PSIHI) of the PDU set indicating that the PDU set is an all-or-nothing PDU set.

Aspect 9: The method of Aspect 7, wherein processing the one or more PDUs further comprises discarding only one or more unreceived PDUs of the PDU set upon expiration of the reassembly timer based at least in part on a PDU set integrated handling indication (PSIHI) of the PDU set indicating that the PDU set is not an all-or-nothing PDU set.

Aspect 10: The method of Aspect 7, wherein the reassembly timer is longer than a delay budget of a radio access link between the receiver and a transmitter of the PDU set based at least in part on the PDU set importance parameter indicating a threshold importance level.

Aspect 11: The method of any of Aspects 6-10, further comprising transmitting information indicating one or more delay parameters or one or more jitter parameters of a link between the receiver and a device associated with the receiver.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a transmitter, comprising:

receiving a configuration of one or more packet data convergence protocol (PDCP) discard timers for protocol data unit (PDU) sets, the configuration indicating one or more PDU set parameters corresponding to the one or more PDCP discard timers, wherein a PDU set integrated handling indication (PSIHI) indicates whether all PDUs of a PDU set are needed for usage of the PDU set; and communicating in accordance with the configuration.

2. The method of claim 1, wherein the one or more PDCP discard timers include a first PDCP discard timer for a first PDU set importance parameter of the one or more PDU set parameters, and a second PDCP discard timer for a second PDU set importance parameter of the one or more PDU set parameters.

3. The method of claim 1, wherein communicating in accordance with the configuration further comprises discarding, upon expiry of a PDCP discard timer of the one or more PDCP discard timers, one or more PDUs of a PDU set based at least in part on the PSIHI of the PDU set.

4. The method of claim 3, wherein discarding the one or more PDUs comprises discarding all PDUs of the PDU set based at least in part on the PSIHI indicating that the PDU set is an all-or-nothing PDU set.

5. The method of claim 3, wherein discarding the one or more PDUs comprises discarding the one or more PDUs of the PDU set, and not one or more other PDUs of the PDU set, based at least in part on the PSIHI indicating that the PDU set is not an all-or-nothing PDU set.

6. A transmitter for wireless communication, comprising:

one or more memories; and one or more processors, coupled to the one or more memories, configured to:

receive a configuration of one or more packet data convergence protocol (PDCP) discard timers for protocol data unit (PDU) sets, the configuration indicating one or more PDU set parameters corresponding to the one or more PDCP discard timers, wherein a PDU set integrated handling indication (PSIHI) indicates whether all PDUs of a PDU set are needed for usage of the PDU set; and communicate in accordance with the configuration.

7. The transmitter of claim 6, wherein the one or more PDCP discard timers include a first PDCP discard timer for a first PDU set importance parameter of the one or more PDU set parameters, and a second PDCP discard timer for a second PDU set importance parameter of the one or more PDU set parameters.

8. The transmitter of claim 6, wherein the one or more processors, to communicate in accordance with the configuration, are configured to discard, upon expiry of a PDCP discard timer of the one or more PDCP discard timers, one or more PDUs of a PDU set based at least in part on the PSIHI of the PDU set.

9. The transmitter of claim 8, wherein the one or more processors, to discard the one or more PDUs, are configured to discard all PDUs of the PDU set based at least in part on the PSIHI indicating that the PDU set is an all-or-nothing PDU set.

10. The transmitter of claim 8, wherein the one or more processors, to discard the one or more PDUs, are configured to discard the one or more PDUs of the PDU set, and not one or more other PDUs of the PDU set, based at least in part on the PSIHI indicating that the PDU set is not an all-or-nothing PDU set.

11. A non-transitory computer-readable medium storing a set of instructions for wireless communication, the set of instructions comprising:

one or more instructions that, when executed by one or more processors of a transmitter, cause the transmitter to:

receive a configuration of one or more packet data convergence protocol (PDCP) discard timers for protocol data unit (PDU) sets, the configuration indicating one or more PDU set parameters corresponding to the one or more PDCP discard timers, wherein a PDU set integrated handling indication (PSIHI) indicates whether all PDUs of a PDU set are needed for usage of the PDU set; and communicate in accordance with the configuration.

12. The non-transitory computer-readable medium of claim 11, wherein the one or more PDCP discard timers include a first PDCP discard timer for a first PDU set importance parameter of the one or more PDU set parameters, and a second PDCP discard timer for a second PDU set importance parameter of the one or more PDU set parameters.

13. The non-transitory computer-readable medium of claim 11, wherein the one or more instructions, that cause the transmitter to communicate in accordance with the configuration, cause the transmitter to discard, upon expiry of a PDCP discard timer of the one or more PDCP discard timers, one or more PDUs of a PDU set based at least in part on the PSIHI of the PDU set.

14. The non-transitory computer-readable medium of claim 13, wherein the one or more instructions, that cause the transmitter to discard the one or more PDUs, cause the transmitter to discard all PDUs of the PDU set based at least in part on the PSIHI indicating that the PDU set is an all-or-nothing PDU set.

15. The non-transitory computer-readable medium of claim 13, wherein the one or more instructions, that cause the transmitter to discard the one or more PDUs, cause the transmitter to discard the one or more PDUs of the PDU set, and not one or more other PDUs of the PDU set, based at least in part on the PSIHI indicating that the PDU set is not an all-or-nothing PDU set.

16. The non-transitory computer-readable medium of claim 11, wherein: the transmitter is a user equipment (UE);

the configuration is received from a network node;

the configuration indicates that the PDCP discard timer is to be used for PDU sets that are associated with the one or more PDU set parameters; and the one or more PDU set parameters comprise a PDU set delay budget (PSDB) parameter.

17. An apparatus for wireless communication, comprising:

means for receiving a configuration of one or more packet data convergence protocol (PDCP) discard timers for protocol data unit (PDU) sets, the configuration indicating one or more PDU set parameters corresponding to the one or more PDCP discard timers, wherein a PDU set integrated handling indication (PSIHI) indicates whether all PDUs of a PDU set are needed for usage of the PDU set; and means for communicating in accordance with the configuration.

18. The apparatus of claim 17, wherein the one or more PDCP discard timers include a first PDCP discard timer for a first PDU set importance parameter of the one or more PDU set parameters, and a second PDCP discard timer for a second PDU set importance parameter of the one or more PDU set parameters.

19. The apparatus of claim 17, wherein the means for communicating in accordance with the configuration further comprise means for discarding, upon expiry of a PDCP discard timer of the one or more PDCP discard timers, one or more PDUs of a PDU set based at least in part on the PSIHI of the PDU set.

20. The apparatus of claim 19, wherein the means for discarding the one or more PDUs comprise means for discarding all PDUs of the PDU set based at least in part on the PSIHI indicating that the PDU set is an all-or-nothing PDU set.

21. The apparatus of claim 19, wherein the means for discarding the one or more PDUs comprise means for discarding the one or more PDUs of the PDU set, and not one or more other PDUs of the PDU set, based at least in part on the PSIHI indicating that the PDU set is not an all-or-nothing PDU set.

22. The apparatus of claim 17, wherein: the apparatus is a user equipment (UE);

the means for receiving the configuration comprise means for receiving the configuration from a network node;

the configuration indicates that the PDCP discard timer is to be used for PDU sets that are associated with the one or more PDU set parameters; and the one or more PDU set parameters comprise a PDU set delay budget (PSDB) parameter.

\*   \*   \*   \*   \*